United States Patent Office 3,141,803
Patented July 21, 1964

3,141,803
SOLID PROPELLANT AND PROCESS USING VINYL DECABORANE COMPOUNDS
Joseph Green, Dover, and George J. Donovan, Boonton, N.J., assignors to Thiokol Chemical Corporation, Bristol, Pa., a corporation of Delaware
No Drawing. Filed May 5, 1961, Ser. No. 108,193
4 Claims. (Cl. 149—19)

This invention relates to liquid compositions curable to form tough elastomers useful as the fuel-binder component of a composite solid propellant grain. The invention also relates to solid propellant grains produced from the liquid compositions. In particular the invention relates to solid propellant grains having a high burning rate produced by use of borane additives.

The liquid compositions generally include 20 to 80 parts by weight of a liquid polymer, 1 to 50 parts by weight of a curing agent and 80 to 20 parts by weight of a liquid organoboron compound of the class

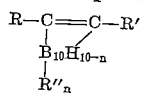

wherein R and R' are each hydrogen, alkyl radicals or alkenyl radicals, R'' is a lower alkyl radical, and $n$ varies from 0 to 4.

Composite solid propellant grains are produced by admixing from 5 to 40 parts by weight of the above liquid compositions with from about 25 to 60 parts by weight of a solid inorganic oxidizer and heating the resulting admixture at a temperature within the range from about 25° to 120° C. for from about 4 hours to 7 days.

Examples of liquid polymers useful in preparing the compositions of this invention include diisocyanate terminated polyesters, polyesteramides, polyetherglycols, and hydrocarbon polymers terminated with carboxy groups such as carboxylated polybutadiene. Curing agents for the polyurethanes include polyols, polyamines, titanate esters and amines and epoxy resins for the carboxy polymers The liquid organoboron compounds useful in preparing the compositions of this invention can be prepared by the method described in application Serial No. 59,460, filed September 29, 1960, of Jack Bobinski and Marvin M. Fein and Nathan Mayes. For example, C-isopropenylvinylene-decaborane of the formula

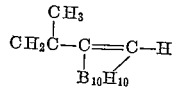

can be prepared by heating isopropenyl acetylene with bis(acetonitrilo)decaborane in benzene at reflux for 24 hours.

The solid inorganic oxidizers useful in forming the solid propellant grains of this invention include ammonium perchlorate and the alkali metal perchlorates such as sodium perchlorate, potassium perchlorate, and lithium perchlorate, ammonium nitrate and the alkali metal nitrates such as sodium nitrate, potassium nitrate and lithium nitrate.

The preparation and curing of the liquid compositions of this invention is illustrated by the following examples. In all of the examples, the liquid urethane polymer employed was "Adiprene L," which is a fully saturated diisocyanate reaction product with a polyetherglycol containing 4.0 to 4.3% by weight of isocyanate groups.

EXAMPLE 1

Into a container jacketed for heating oil circulation and equipped with mixing means and means for evacuation were placed 100 parts by weight of Adiprene L and 100 parts by weight of C-isopropenylvinylenedecaborane (IPVD) of the formula

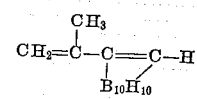

The container was sealed, evacuated and mixing was started and continued until a homogeneous mix which had been completely degassed was obtained. The mixer was then stopped and the container brought to ambient pressure. The container was opened and 11 parts by weight of methylene bis-orthochloroaniline were added. The container was then again sealed, evacuated and the contents mixed until a homogeneous mix which had been completely degassed was obtained. The mixer was stopped, the container was brought to ambient pressure, opened, and the contents cast into a mold. The mold was then placed in an oven at 100° C. to cure for 330 minutes. At the end of this time, the mold was removed from the oven and cooled to room temperature. Examination of the sample showed that a tough elastic cure was obtained. Pertinent data for additional examples are shown in the following Table I.

Table I

| Exp. No. | Adiprene | IPVD | TBS[1] | Moca | Durometer Shore A | Time (Min.) | Temp. (°C.) | Comments |
|---|---|---|---|---|---|---|---|---|
| 1 | 100 | | | 11 | 68-73 | 330 | 100 | Excellent cure—good strength. |
| 2 | 100 | 100 | | 11 | | 330 | 100 | Undercured. |
| 3 | 100 | | 100 | 11 | 30 | 315 | 100 | Good elastic cure. |
| 4 | 100 | 100 | | 11 | 52 | 420 | 100 | Excellent cure—good strength. |
| 5 | 100 | 100 | | 10 | | 420 | 100 | Good tight cure. |
| 6 | 100 | 100 | | 7.5 | | 420 | 100 | Undercured. |
| 7 | 100 | 100 | | 5.0 | | 420 | 100 | No cure—viscous liquid. |
| 8 | 100 | 100 | | 2.5 | | 420 | 100 | Do. |
| 9 | 100 | 100 | | 10 | | 420 | 100 | Viscous liquid. |
| 10 | 100 | 100 | | 7.5 | | 420 | 80 | Semi-solid. |
| 11 | 100 | 100 | | 5.0 | | 420 | 80 | Viscous liquid. |
| 12 | 100 | 100 | | 2.5 | | 420 | 80 | Do. |
| 13 | 100 | 100 | | 10 | | 20 hrs. | 100 | Excellent elastic cure. |
| 14 | 100 | 100 | | 5 | | 20 hrs. | 100 | Do. |

[1] TBS—tributyl sebacate.

EXAMPLE 15

In this example, a solid composite propellant grain was prepared. The propellant mix was compounded in a vacuum sealed Baker-Perkins type mixer jacketed for heating oil circulation. To the mixing basket were added 100 parts by weight of Adiprene L and 100 parts by weight of C-isopropenylvinylenedecaborane. The chamber was evacuated and the temperature was brought up to 40° C. Mixing was then started and continued until completely degassed homogeneous mix was obtained. The mix was cooled, the mixer stopped and the chamber brought to ambient pressure and opened. To the mixing basket were then added 637 parts by weight of ammonium perchlorate together with 0.32 part by weight of copper chromite. The chamber was again sealed and evacuated, the temperature raised to 40° C., and mixing started and continued until a degassed homogeneous mix was obtained. Again the mix was cooled, the mixer stopped and the chamber brought to ambient pressure. To the mixing basket were then added 11.9 parts by weight of methylene bis-orthochloroaniline and the heating and mixing procedure was repeated.

The cooled propellant mix was castable at room temperature and was removed and cast in a mold. The mold was placed in an oven at 100° C. to cure for 660 minutes at the end of which time it was removed from the oven and cooled. The resulting composite solid propellant grain was a strong rubbery mass with no porosity. Pertinent data for additional examples are shown in Table II.

Table II

| Exp. | 15 | 16 | 17 |
|---|---|---|---|
| Adiprene L | 100 | 100 | 100 |
| PVD | 100 | 100 | 100 |
| Moca | 11.9 | 11 | 5 |
| Copper Chromite | 0.32 | 0.5 | 0.5 |
| Ammonium Perchlorate | 637 | 634 | 616 |
| Curing Cycle: | | | |
| Time (Min.) | 660 | 660 | 660 |
| Temp. (° C.) | 100 | 100 | 100 |
| Processing | Cast | Cast | Cast |

For best results, the polyurethane curing agent should be present in an amount of about 8% to 12% by weight of the liquid urethane polymer. Also the use of about 0.5% copper chromite, based on the weight of the solid inorganic oxidizer, was found to aid materially in the castability of the propellant mixes. The liquid organoboron component of the liquid compositions of this invention serves both as a plasticizer in and to provide a high energy content to the cured composite solid propellant grain.

The composite solid propellant grains of this invention are suitable for use in rocket power plants and other jet propelled devices. They burn with high flame speeds, have high heats of combustion and are of the high specific impulse type. They burn uniformly without disintegration when ignited by conventional means, such as a pyrotechnic type igniter, and are mechanically strong enough to withstand ordinary handling.

We claim:
1. A liquid composition curable to form a tough elastomer useful as the fuel-binder component of a composite solid propellant, said liquid composition consisting essentially of 20 to 80 parts by weight of a liquid polymer selected from the class consisting of diisocyanate terminated polyesters, diisocyanate terminated polyesteramides, diisocyanate terminated polyetherglycols and diisocyanate terminated hydrocarbons, 1 to 50 parts by weight of carboxy group terminated a curing agent, and 80 to 20 parts by weight of an organoboron compound of the class

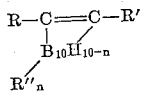

wherein R and R' are each selected from the class consisting of hydrogen, alkyl radicals and alkenyl radicals, R'' is a lower alkyl radical, and $n$ varies from 0 to 4.

2. The liquid composition of claim 1 wherein the liquid polymer is a fully saturated diisocyanate terminated polyetherglycol, the curing agent is methylene bis-orthochloroaniline, and the organoboron compound is C-isopropenyl-vinylenedecaborane of the formula

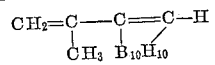

3. A method for preparing a composite solid propellant grain which comprises heating at a temperature within the range from about 25° to 120° C. for from about 4 hours to 7 days an admixture consisting essentially of from about 60 to 95 parts by weight of a solid inorganic oxidizer and from about 5 to 40 parts by weight of a composition of claim 1.

4. A method for preparing a composite solid propellant grain which comprises heating at a temperature within the range from about 25° to 120° C. for from about 4 hours to 7 days an admixture consisting essentially of from about 60 to 95 parts by weight of ammonium perchlorate and from about 5 to 40 parts by weight of a composition of claim 2.

References Cited in the file of this patent
UNITED STATES PATENTS

| 2,970,898 | Fox | Feb. 7, 1961 |
| 3,002,026 | Palchak | Sept. 26, 1961 |
| 3,006,743 | Fox et al. | Oct. 31, 1961 |